Patented Feb. 24, 1942

2,274,367

UNITED STATES PATENT OFFICE 2,274,367

AGE RESISTING RUBBER COMPOSITION

Joseph R. Ingram, Nitro, W. Va., assignor to Monsanto Chemical Company, St. Louis, Mo., a corporation of Delaware No Drawing. Application May 13, 1938, Serial No. 207,772

16 Claims. (Cl. 260—799)

The present invention relates to the art of rubber manufacture, and particularly relates to rubber compositions which resist deterioration due to aging or to exposure to the atmosphere. It has long been known that such deterioration can be greatly retarded by treating the rubber before or after vulcanization with certain substances known as age-resisters or antioxidants. One object of this invention is to provide a superior class of antioxidants for rubber.

The age resisting characteristics of a vulcanized rubber product can be readily ascertained by subjecting samples of the vulcanized product in a bomb to the action of air or oxygen under elevated pressure. The aged rubber samples are then examined and tested and the test data compared with the results obtained on testing the unaged rubber samples. The deterioration in properties effected as a result of the oxidation is indicative of the result that would normally be expected of that particular stock during actual service. Such a test produces an effect on a vulcanized rubber stock comparable with that resulting from several years of natural aging of the rubber depending upon the condition of the test.

The substances which are employed as antioxidants or age-resisters according to the present invention are the aldehyde reaction products of indenes. It is meant to include by the term "indenes," indene itself as well as derivatives of indene obtainable by further reacting indene. Among the derivatives of indene which have been found to produce valuable antioxidants when reacted with aldehydes, are the indene phenols and indene thio phenols. The new and preferred class of antioxidants or age-resisters are illustrated by the following typical examples but not limited thereto: the reaction product of indene and butylaldehyde; the reaction product of indene and benzaldehyde; the reaction product of indene and formaldehyde; the reaction product of indene thio phenol and formaldehyde; the reaction product of indene phenol and formaldehyde; the reaction product of indene thio cresol and formaldehyde; the reaction product of indene catechol and formaldehyde; the reaction product of indene hydroquinone and formaldehyde; the reaction product of indene catechol and butylaldehyde and the reaction product of indene phenol and acetaldehyde.

The antioxidants or age-resisters of the present invention are condensation products of unknown chemical structure, obtainable by reacting an indene with an aldehyde usually in the presence of a suitable catalyst. As specific examples of methods by which the preferred class of materials are obtainable, but which are intended to illustrate the invention and not to limit the same, the following typical preparations are described in some detail.

Substantially 100 parts by weight of technical indene (substantially 0.86 molecular proportion) and substantially 100 parts by weight of approximately 30% formaldehyde (substantially 1.0 molecular proportion) and substantially 10 parts by weight of 28–30% hydrochloric acid were placed in a suitable container fitted with a reflux condenser and heated to reflux temperature for eight hours. After cooling the oil layer was separated and washed with water and dried. The unreacted ingredients were then removed by distilling at atmospheric pressure up to 170° vapor temperature. The last traces of unreacted material were removed by raising the liquid temperature to 245° under 15 mm. pressure. The residue comprising the desired reaction product was incorporated in a rubber stock as hereinafter shown.

Other aldehydes may be employed where convenient or desirable as illustrated by the following preparation. 21 parts by weight of indene phenol obtained as described in United States Patent No. 1,754,052 was placed in a suitable reactor together with 9 parts by weight of butylaldehyde and a small amount of hydrochloric acid. The mixture was heated on a steam bath for 4 hours and then disssolved in benzene, washed free of acid and dried. The solvent and unreacted materials were removed by distilling up to 185° C. vapor temperature at 6 mm. pressure, the liquid temperature reaching 250° C. The residue comprising the desired reaction product was incorporated into rubber as hereinafter shown and found to exhibit desirable antioxidant properties.

Where convenient or desirable other methods of preparation and other means of carrying out the invention may be employed. Likewise other catalysts may be substituted for hydrochloric acid and the times and temperatures of reaction varied without departing from the spirit of the present invention. Obviously other methods of purifying and working up the reaction products may be utilized.

The new and preferred antioxidants of the present invention are especially useful for white rubber stocks since they are usually resistant to discoloration. As a specific embodiment of the invention showing the antioxidant or age-resisting properties of the aldehyde reaction products of indenes but which is intended to illustrate the invention and not to limit the same, white rubber stocks are compounded comprising

|  | Stock A | Stock B |
|---|---|---|
|  | Parts by weight | Parts by weight |
| Pale crepe | 100 | 100 |
| Zinc oxide | 60 | 60 |
| Lithopone | 20 | 20 |
| Sulfur | 2 | 2 |
| Benzothiazyl thiol benzoate | 0.825 | 0.825 |
| Diphenyl guanidine phthalate | 0.675 | 0.675 |
| Paraffin | 0.250 | 0.250 |
| Reaction product of indene and formaldehyde | 1.0 |  |
| Reaction product of indene phenol and formaldehyde |  | 1.0 |

The rubber stocks so compounded were vulcanized in a press at the temperature of twenty pounds steam pressure per square inch and the modulus and tensile properties of the cured rubber stocks compared with those of the same cured stocks which had been aged in an air bomb at 250° F. and eighty pounds pressure. The comparison of the aged and unaged stocks is given in Table I.

*Table I*

| Cure | | Stock | Modulus of elasticity in lbs./in.² at elongations of— | | Tensile at break in lbs./in.² | Ult. elong., percent |
|---|---|---|---|---|---|---|
| Time in minutes | Hours air bomb aged | | 300% | 500% | | |
| 30 | 0 | A | 535 | 1,700 | 3,800 | 690 |
| 30 | 4 | A | 480 | 1,620 | 3,000 | 645 |
| 30 | 6 | A | 400 | 1,300 | 2,450 | 655 |
| 30 | 0 | B | 510 | 1,720 | 4,150 | 710 |
| 30 | 4 | B | 620 | 2,005 | 3,410 | 630 |
| 30 | 6 | B | 510 | 1,730 | 2,775 | 600 |
| 45 | 0 | A | 635 | 1,950 | 4,250 | 695 |
| 45 | 4 | A | 540 | 1,770 | 3,000 | 635 |
| 45 | 6 | A | 450 | 1,450 | 2,500 | 620 |
| 45 | 0 | B | 555 | 1,880 | 4,275 | 700 |
| 45 | 4 | B | 580 | 1,980 | 3,500 | 635 |
| 45 | 6 | B | 495 | 1,650 | 2,450 | 590 |

The above data show the desirable antioxidant properties of the preferred class of materials when incorporated in a typical white rubber stock. In addition to the above tests the unaged rubber stocks described above were exposed to ultra violet light and were found to be resistant to discoloration.

As a further specific embodiment of the invention but which is not intended to limit the invention, rubber stocks were compounded comprising

|  | Stock C | Stock D |
|---|---|---|
|  | Parts by weight | Parts by weight |
| Pale crepe | 100 | 100 |
| Zinc oxide | 60 | 60 |
| Lithopone | 20 | 20 |
| Sulfur | 2 | 2 |
| Benzothiazyl thiol benzoate | 0.825 | 0.825 |
| Diphenyl guanidine phthalate | 0.675 | 0.675 |
| Paraffin | 0.25 | 0.25 |
| Reaction product of indene hydroquinone and formaldehyde | 1.0 |  |
| Reaction product of indene catechol and formaldehyde |  | 1.0 |

The rubber stocks so compounded were vulcanized in a press at the temperature of twenty pounds steam pressure per square inch and the modulus and tensile properties of the cured rubber stocks compared with those of the same cured stocks which had been aged in an air bomb at 250° F. and eighty pounds pressure. The comparison of the aged and unaged stocks is given in Table II.

*Table II*

| Cure | | Stock | Modulus of elasticity in lbs./in.² at elongations of— | | Tensile at break in lbs./in.² | Ult. elong., percent |
|---|---|---|---|---|---|---|
| Time in minutes | Hours air bomb aged | | 300% | 500% | | |
| 30 | 0 | C | 520 | 1,775 | 4,120 | 700 |
| 30 | 0 | D | 530 | 1,740 | 3,650 | 675 |
| 30 | 4 | C | 530 | 1,860 | 3,075 | 610 |
| 30 | 4 | D | 590 | 1,970 | 3,250 | 615 |
| 30 | 6 | C | 390 | 1,310 | 2,000 | 605 |
| 30 | 6 | D | 585 | 2,000 | 3,375 | 625 |
| 45 | 0 | C | 600 | 1,900 | 4,315 | 700 |
| 45 | 0 | D | 640 | 1,930 | 4,100 | 670 |
| 45 | 4 | C | 585 | 1,910 | 3,175 | 615 |
| 45 | 4 | D | 635 | 2,025 | 3,200 | 595 |
| 45 | 6 | C | 390 | 1,190 | 1,725 | 585 |
| 45 | 6 | D | 600 | 2,035 | 3,400 | 630 |

The above data further show the desirable antioxidant properties of the preferred class of materials.

From the specific examples hereinbefore set forth it is shown that rubber compositions containing small proportions of the preferred class of materials markedly resist the deteriorating influences of heat, oxidation and light.

Obviously practice of this invention is not limited to the specific compositions given above such compositions being merely illustrative of the manner of employing the antioxidants or age-resisters of this invention. The antioxidants or age-resisters may be employed in different proportions than herein described and in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than those specifically shown with varying differences in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of preserving a rubber which comprises treating a rubber with an aldehyde reaction product of a member of a group consisting of indene, indene phenols and indene thiophenols.

2. The method of preserving a rubber which comprises treating a rubber with an aliphatic aldehyde reaction product of indene.

3. The method of preserving a rubber which comprises treating a rubber with a formaldehyde reaction product of an indene phenol.

4. The method of preserving a rubber which comprises treating a rubber with a formaldehyde reaction product of indene.

5. The method of preserving a rubber which comprises treating a rubber with a formaldehyde reaction product of indene phenol.

6. The method of preserving a rubber which comprises treating a rubber with a formaldehyde reaction product of indene hydroquinone.

7. An age resisting rubber composition comprising a rubber and an aldehyde reaction product of a member of a group consisting of indene, indene phenols and indene thiophenols.

8. An age resisting rubber composition comprising a rubber and an aliphatic aldehyde reaction product of indene.

9. An age resisting rubber composition comprising a rubber and a formaldehyde reaction product of an indene phenol.

10. An age resisting rubber composition comprising a rubber and a formaldehyde reaction product of indene.

11. An age resisting rubber composition comprising a rubber and a formaldehyde reaction product of indene phenol.

12. An age resisting rubber composition comprising a rubber and a formaldehyde reaction product of indene hydroquinone.

13. The method of preserving a rubber which comprises treating a rubber with an aliphatic aldehyde reaction product of an indene phenol.

14. An age resisting rubber composition comprising a rubber and an aliphatic aldehyde reaction product of an indene phenol.

15. The method of preserving india rubber which comprises treating india rubber with an aldehyde reaction product of a member of a group consisting of indene, indene phenols, and indene thiophenols.

16. An age resisting rubber composition comprising india rubber and an aldehyde reaction product of a member of a group consisting of indene, indene phenols and indene thiophenols.

JOSEPH R. INGRAM.